United States Patent
Telly et al.

[11] Patent Number: 6,155,136
[45] Date of Patent: Dec. 5, 2000

[54] GEAR SHAFT ASSEMBLY AND METHOD OF MAKING THE SAME

[75] Inventors: Walter Peter Telly, Perkasie; Joel Eric Higbee, Doylestown; Henry Karl Sprenger, Huntingdon, all of Pa.

[73] Assignee: Milton Roy Company, Ivyland, Pa.

[21] Appl. No.: 09/232,089

[22] Filed: Jan. 15, 1999

[51] Int. Cl.[7] .................................................. F16H 57/02
[52] U.S. Cl. ............................................. 74/606 R; 74/44
[58] Field of Search .................................. 74/606 R, 44, 74/579 E; 384/416, 417, 418; 464/179

[56] References Cited

U.S. PATENT DOCUMENTS

| | | | |
|---|---|---|---|
| 833,707 | 10/1906 | Corcoran | 384/416 |
| 872,030 | 11/1907 | Stickney | 384/416 |
| 1,502,914 | 7/1924 | Joy | 74/44 |
| 1,682,788 | 9/1928 | Janette | 74/44 |
| 1,693,073 | 11/1928 | Donath | 74/606 R |
| 2,353,431 | 7/1944 | Arden | 170/173 |
| 2,451,342 | 10/1948 | Kent | 287/53 |
| 2,519,477 | 8/1950 | Kind | 74/44 |
| 2,553,521 | 5/1951 | Reitberger | 74/44 |
| 2,567,482 | 9/1951 | Hoffman et al. | 74/432 |
| 3,033,597 | 5/1962 | Miller | 287/53 |
| 3,216,099 | 11/1965 | Boss | 29/240 |
| 3,496,875 | 2/1970 | Van Allen et al. | 103/44 |
| 3,802,289 | 4/1974 | Cheek | 74/606 R |
| 4,085,628 | 4/1978 | McWhorter | 74/579 E |
| 4,112,786 | 9/1978 | Thomas | 74/606 R |
| 4,188,800 | 2/1980 | Fujita et al. | 464/179 |
| 4,562,976 | 1/1986 | Ban | 384/417 |
| 4,848,933 | 7/1989 | Bigo et al. | 384/416 |
| 5,442,845 | 8/1995 | Callender | 29/407 |
| 5,509,790 | 4/1996 | Schuderi et al. | 417/201 |
| 5,577,565 | 11/1996 | Kocab et al. | 175/228 |
| 5,632,684 | 5/1997 | Kumar et al. | 464/179 |

FOREIGN PATENT DOCUMENTS

| | | | |
|---|---|---|---|
| 40 4-254049 | 9/1992 | Japan | 74/606 R |

OTHER PUBLICATIONS

"Milton Roy Metering Pump Technology", Milton Roy Bulletin 210, Brochure (18 pages), published by Milton Roy Company, Flow Control Division, A Sundstrand Subsidiary, Ivyland, Pennsylvania.

*Primary Examiner*—David A. Bucci
*Assistant Examiner*—Chong H. Kim

[57] ABSTRACT

A gear shaft assembly for use with a pump and a method of making the same are gear shaft of the present invention. The disclosed assembly includes a housing, a stepped shaft, and a gear rotationally disposed on the shaft. The shaft has a first end disposed in a first bore defined in the housing and a second end in threaded engagement with a second bore of the housing. A first shoulder of the shaft disposed adjacent the first end engages a portion of the housing to define a fully inserted position of the shaft. The gear is disposed on an intermediate section of the shaft between the first shoulder and a second shoulder located adjacent the second end.

16 Claims, 1 Drawing Sheet

GEAR SHAFT ASSEMBLY AND METHOD OF MAKING THE SAME

FIELD OF THE INVENTION

The invention relates generally to pumps, and, more particularly, to a gear shaft assembly for use with a pump and a method of making the same.

BACKGROUND OF THE INVENTION

Pumps are used in a variety of applications and fields to move fluid from one location to another. A gear shaft assembly of one type of such a pump 10 is shown in FIG. 1. As illustrated in that figure, the pump 10 includes a housing 12 defining two oppositely disposed bores 14, 16 and a cavity 18. A threaded retainer 20 is threaded into one of the bores 14. The retainer 20 is annular. One end of a shaft 22 is fixedly secured within the opening defined by the annular retainer 20. The other end of the shaft 22 is fixedly secured in the bore 16. Typically, the retainer 20 is secured in the bore 14 with an adhesive such as retainer #680 which is commercially available from LocTite™. The ends of the shaft 22 are also secured in the retainer 20 and the bore 16 using a similar adhesive.

A gear assembly 26 is mounted on the shaft 22 for free rotation thereabout. The gear assembly 26 is located on the shaft by a spacer 27. The gear assembly 26 typically includes a toothed gear 28 and an eccentric (not shown in FIG. 1). The toothed gear 28 is usually driven to rotate by a motor or the like coupled to the gear 28 by a drive train which may include a worm gear (not shown). The rotation of the gear 28 about the shaft 22 causes the eccentric to rotate. The eccentric is commonly coupled to a piston (not shown) via a crank 30. The rotation of the eccentric, thus, causes the piston to reciprocate. The reciprocation of the piston is used to create a pumping force which, with suitably arranged conventional valving, is used to move fluid through a conduit or the like.

While pumps employing gear shaft assemblies of the foregoing type are very effective, they do suffer from certain disadvantages. For example, such gear shaft assemblies include a relatively large number of parts, are complicated to build and require extensive assembly time. Because they are assembled with adhesive, such assemblies are also difficult to disassemble and, thus, similarly difficult to repair. Specifically, it is typically necessary to heat the adhesive to disassemble the unit. The gear shaft assemblies of the foregoing type are also disadvantaged in that they are susceptible to leakage through the opposed bores 14, 16. Moreover, the primer and adhesive used to clean and adhere the parts of the assembly together cause skin irritations to the assemblers and may include harmful chemicals. The confined area within the housing, and the difficulty of properly locating the threaded bushing 20 in the housing also increase the effort required to assemble the gear shaft assemblies of the foregoing type.

Some of the above noted disadvantages are evident in the assembly process required to construct the gear shaft assembly of FIG. 1. Specifically, to construct the subject assembly, one must first clean the housing 12 at the threaded bushing bore 14 and the bore 16 with a cleaning solvent such as Primer #7649 sold by LocTite™. Then, a mechanical stop (not shown) must be installed within the housing 12 to aid in properly locating the threaded bushing 20 within the bore 14. The threaded bushing 20 is next cleaned with the noted solvent, and a liberal quantity of the above-noted adhesive is applied to the threads of the bushing 20 and/or the bore 14.

The bushing 20 is then screwed into the bore 14 until it abuts the mechanical stop. The assembly is next allowed to sit for a few minutes while the adhesive cures.

The spacer 27 is then positioned within the housing 12 and the shaft 22 is inserted through the bore 16 and the spacer 27. The shaft 22 is advanced until it is flush with the inner side of the spacer 27. The pre-assembled eccentric/gear assembly 26 is then loaded into the housing 12 and positioned with its shaft hole in alignment with the shaft 22. The end of the shaft 22 extending outside the housing 12 is then tapped to drive the shaft through the gear assembly such that the shaft 22 stops just short of the hole defined in the threaded bushing 20.

Adhesive is then applied to the portion of the shaft 22 still remaining outside the housing 12 and to the inside surface defining the hole of the threaded bushing 20. The shaft 22 is then taped into place such that its ends are flush with both sides of the housing 12. Any excess adhesive is then wiped off the sides of the housing 12.

SUMMARY OF THE INVENTION

In accordance with an aspect of the invention, a gear shaft assembly is provided for use with a pump. The assembly includes a housing defining a cavity, a first bore disposed in a first side of the housing, and a second bore disposed in a second side of the housing opposite the first bore. It also includes a stepped shaft having a first end with a first diameter disposed in the first bore, and a second end with a second diameter disposed in threaded engagement with the second bore. The shaft has an intermediate section with a third diameter disposed between the first and second ends. The first diameter is smaller than the third diameter such that the shaft includes a first shoulder between the intermediate section and the first end. The first shoulder engages a portion of the housing to define a fully inserted position of the shaft. The third diameter is smaller than the second diameter such that the shaft includes a second shoulder between the intermediate section and the second end. The gear shaft assembly is also provided with a gear disposed for rotation about the intermediate section of the shaft between the first and second shoulders.

In some embodiments, the portion of the housing engaging the first shoulder comprises a boss projecting into the cavity.

In some embodiments, the gear shaft assembly also includes an o-ring seal located adjacent the second end of the shaft to substantially prevent leakage through the second bore.

In some embodiments, the second end of the shaft defines bores dimensioned and located to facilitate threading the shaft into the housing with a spanner wrench.

In the preferred embodiments, the first bore comprises a blind hole.

In accordance with another aspect of the invention, a gear shaft assembly is provided for use with a pump. The assembly includes a housing defining a cavity, a first bore and a second bore. The first and second bores are disposed in substantial alignment on opposite sides of the housing. The housing includes a boss disposed opposite the second bore. The assembly also includes a shaft having a longitudinal axis, a first end dimensioned for insertion into the first bore and a second end dimensioned for insertion into the second bore. The shaft includes a shoulder adjacent the second end. Additionally, the gear shaft assembly is provided with a gear located for rotational movement on the shaft between the shoulder and the boss such that the shoulder and the boss substantially prevent movement of the gear along the longitudinal axis of the shaft.

In some embodiments, the shaft includes a second shoulder adjacent the first end, the second end of the shaft is in threaded engagement with the second bore, and the second shoulder cooperates with the boss to define a fully inserted shaft position.

In accordance with still another aspect of the invention, a method is provided for constructing a gear shaft assembly within a housing. The method includes the step of providing a housing having first and second oppositely disposed bores. The first bore is open ended. The second bore is a blind hole. The method also includes the steps of: inserting a first end of a shaft into the housing through the first bore; inserting the first end of the shaft into a gear assembly located within the housing; further inserting the shaft into the housing such that the first end enters the second bore; and threading the second end of the shaft into the first bore to cause the shaft to move further into the housing until a shoulder on the shaft disposed adjacent the first end abuts a boss disposed within the housing adjacent the second bore.

In some embodiments, the method also includes the step of placing an o-ring seal on the shaft adjacent the second end of the shaft.

Other features and advantages are inherent in the apparatus and method claimed and disclosed or will become apparent to those skilled in the art from the following detailed description and its accompanying drawings.

DESCRIPTION OF THE PREFERRED EMBODIMENT

Figure 2:
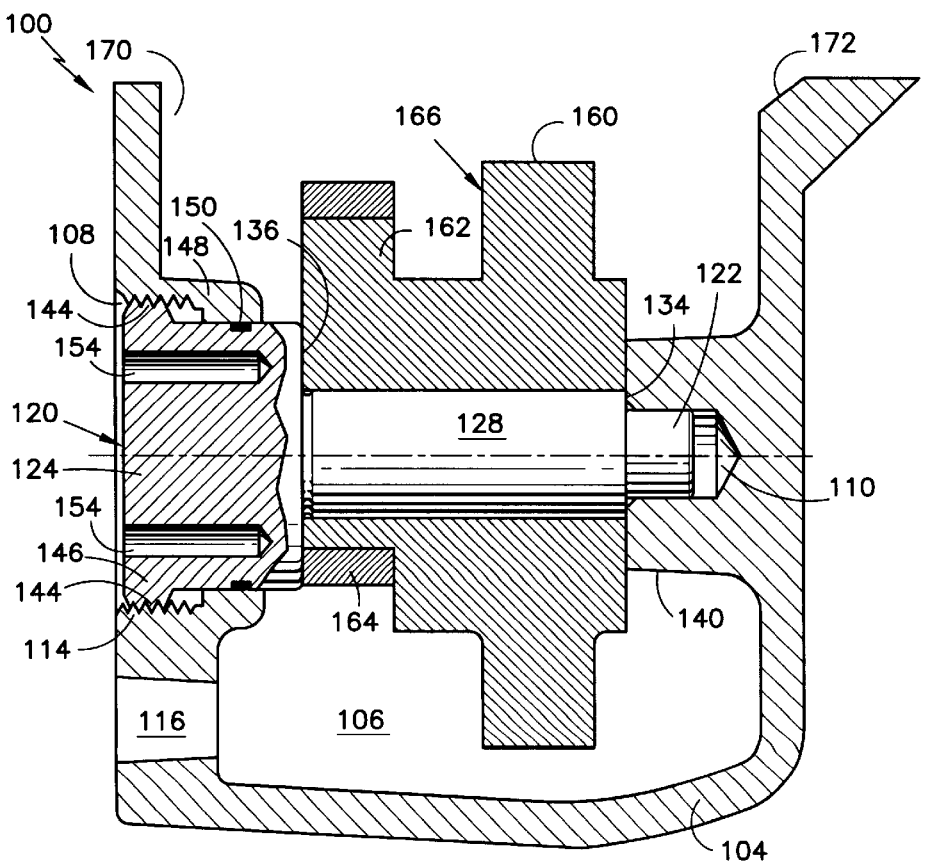
FIG. 2 is a schematic illustration of a gear shaft assembly constructed in accordance with the teachings of the instant invention.

A gear shaft assembly 100 constructed in accordance with the teachings of the invention is shown in FIG. 2. Although the disclosed assembly is preferably employed as part of a pump, persons of ordinary skill in the art will readily appreciate that the teachings of the invention are not limited to pumps, pumping applications, or to any other particular environment of use. On the contrary, the teachings of the invention can be applied to any application which would benefit from the advantages they offer.

As shown in FIG. 2, the disclosed assembly 100 includes a housing 104. The housing 104 can be constructed of any desired material, but in the preferred embodiment is manufactured from cast iron. In any event, as shown in FIG. 2, the housing 104 defines a cavity 106 and two bores 108, 110. The bores 108, 110 are disposed in substantial alignment on opposite sides of the housing 104. In order to reduce leakage, one of the bores 110 is a blind hole. In other words, the bore 110 has a closed end which terminates in a wall of the housing 104. The other bore 108 is open ended and includes threads 114. As shown in FIG. 2, the housing 104 may optionally include a drain hole 116 with a removable plug (not shown).

For the purpose of supporting a gear assembly within the housing, the apparatus 100 is further provided with a shaft 120. As shown in FIG. 2, the shaft 120 is generally cylindrical in construction and includes a longitudinal axis. The shaft 120 also includes a distal end 122 which is dimensional for insertion into the blind hole 110 and a proximal end 124 which is dimensioned for insertion into the threaded bore 108. As explained below, to facilitate assembly of the apparatus 104, the shaft 120 is stepped. In other words, the shaft 120 includes one or more sections of different diameters with shoulders defined therebetween.

In the illustrated embodiment, the distal end 122 of the shaft has a smaller diameter than the proximal end 124 of the shaft. In addition, the shaft 120 includes an intermediate section 128 having a diameter which is larger than the diameter of the distal end 122 but smaller than the diameter of the proximal end 124. As a result, the shaft defines a distal shoulder 134 between the intermediate section 128 and the distal end 122 and a proximal shoulder 136 between the proximal end 124 and the intermediate section 128.

For the purpose of defining a fully inserted position of the shaft 120, the housing 104 is provided with a casted boss 140. The boss 140 is disposed adjacent the blind hole 110 opposite the threaded bore 108. As shown in FIG. 2, the boss 140 projects into the cavity 106. Preferably, the blind hole 110 is disposed substantially in the center of the boss 140. As also shown in FIG. 2, the boss 140 cooperates with the distal shoulder 134 of the shaft 120 to limit insertion of the shaft 120 into the housing 104 and to thereby define the fully inserted position of the shaft 120. The positive engagement between the shoulder 134 and the boss 140 facilitates assembly by unmistakably stopping insertion of the shaft 120 and by eliminating the need for inserting a separate mechanical stop into the cavity 106 during assembly as was required in prior art devices.

To removably secure the shaft 120 within the housing 104, the proximal end of the shaft 120 is provided with threading 144 which is dimensioned to engage the threading 114 of the bore 108. In order to protect the threading 114 of the bore 108 from damage during insertion and/or removal of the shaft 120, the proximal end of the shaft 124 is stepped. In particular, the terminal end of the proximal end 124 of the shaft 120 has a larger diameter than the remainder of the proximal end 124 of the shaft 120. The threading 144 is disposed on this terminal end such that the threading 144 is supported on a surface 146 at a height for engaging the threads 114 of the bore 108 while the remainder of the shaft 120 will typically be displaced from the threads 114 during assembly and disassembly. As shown in FIG. 2, the housing 104 is dimensioned to accommodate the stepped construction of the proximal end 124 of the shaft 120. Specifically, it includes an internal ring 148 defining a bore sized to closely mate with the distal portion of the proximal end 124 of the shaft 120.

To substantially prevent and, preferably, eliminate leakage through the bore 108, an o-ring seal 150 is preferably mounted on the proximal end 124 of the shaft 120. As shown in FIG. 2, the o-ring seal 150 is preferably located such that, when the shaft 120 is in its fully inserted position, the seal 150 is disposed adjacent the internal ring 148.

For the purpose of facilitating insertion and removal of the shaft 120, the proximal end 124 of the shaft 120 defines at least two, open-ended bores 154. These bores 154 are preferably dimensional and located to facilitate threading the shaft 120 into (and out of) the housing 104 with a conventional spanner wrench. In the preferred embodiment, the bores 154 are eliminated and the end of the shaft 120 is provided with two flats to facilitate insertion and removal of the shaft 120 with a conventional adjustable wrench or a box wrench.

A gear 160 is mounted on the intermediate section 128 of the shaft 120. As shown in FIG. 2, the gear 160 defines a central bore which is sized to receive the shaft 120 such that the gear 160 can freely rotate about the intermediate section 128. As also shown in FIG. 2, the gear 160 may be coupled to, or formed integrally with, an eccentric 162. A crank 164 is mounted on the eccentric 162 to couple the rotational movement of the eccentric to a piston or some other external element.

The eccentric/gear assembly 166 is disposed on the shaft between the proximal shoulder 136 and the boss 140. The proximal shoulder 136 and the boss 140 preferably substantially prevent movement of the eccentric/gear assembly 166 along the longitudinal axis of the shaft 120; preferably without substantially interfering with the rotational movement of the assembly 166. Persons of ordinary skill in the art will readily appreciate that, although the gear 160 is disposed adjacent the boss 140 and the eccentric 162 is disposed adjacent the proximal shoulder 136 in the illustrated embodiment, the orientation of the eccentric/gear assembly 166 could be reversed such that the eccentric 162 is disposed adjacent the boss 140 and the gear 160 is disposed adjacent the proximal shoulder 136 without departing from the scope or spirit of the invention. Persons of ordinary skill in the art will also readily appreciate that the eccentric 162 could be eliminated altogether without departing from the scope or spirit of the invention.

For the purpose of facilitating insertion of the gear assembly 166 into the cavity 106, the top of the housing 104 defines an opening 170. As shown in FIG. 2, the opening 170 is preferably wider than that provided in prior art gear shaft assemblies. To provide further maneuverability during assembly, the inner wall of the housing 106 preferably includes a flared section 172 adjacent the opening 170.

During assembly, a housing 104 is casted and then drilled to form the blind hole 110 and the threaded bore 108. Once the housing 104 is so prepared, the o-ring 150 is positioned on the proximal end 124 of the shaft 120. An eccentric/gear assembly 166 is lowered into the cavity 106 of the housing 104 through the opening 170. The distal end 122 of the shaft 120 is then inserted into the housing 104 through the bore 108 and into the bore of the eccentric/gear assembly 166. The shaft 120 is then advanced into the housing 104 such that it passes through the eccentric/gear assembly 166 and into the blind hole 110. A wrench is then used to thread the threads 144 of the proximal end 124 of the shaft into engagement with the threads 114 of the bore 108. Of course, threading the shaft 120 into the bore 108 in this manner advances the shaft 120 further into the housing 104. The wrench is used to so advance the shaft 120 until the distal shoulder 134 of the shaft 120 abuts the boss 140 (i.e., until the shaft 120 reaches the fully inserted position).

Figure 1:
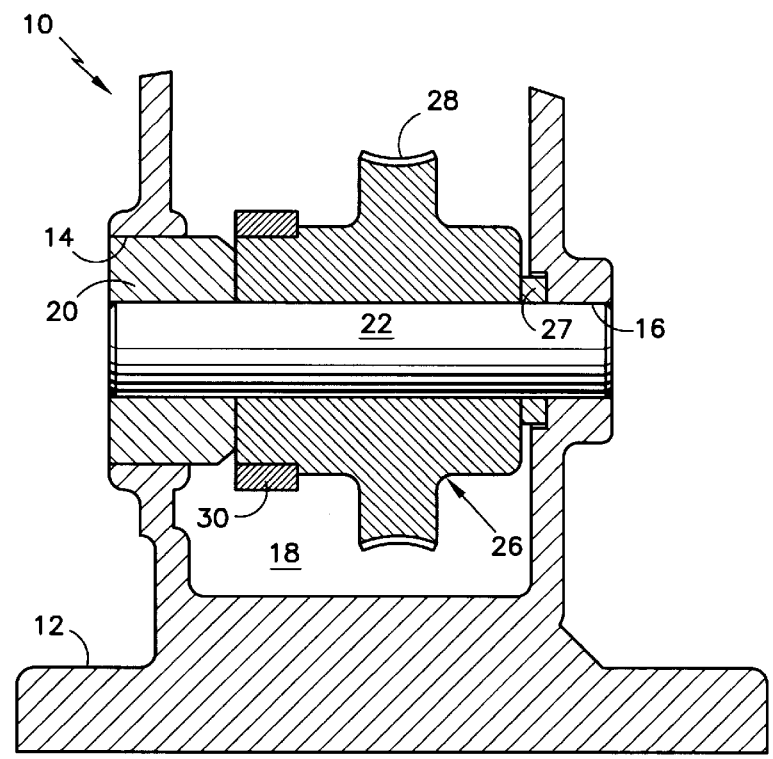
FIG. 1 is a schematic illustration of a prior art gear shaft assembly.

From the foregoing persons of ordinary skill in the art will readily appreciate that a new and improved gear shaft assembly 100 and method of making the same has been disclosed. The disclosed assembly 100 has many advantages over the prior art. For example, the disclosed assembly 100 does not employ adhesive to secure the shaft 120 in place. As a result, contact with the potentially hazardous adhesive has been eliminated and disassembly for repairs has been greatly simplified. By way of another example, the stepped shaft 120 and the boss 140 have eliminated the need for the threaded bushing 20 and the spacer 27 of the prior art assembly 10 shown in FIG. 1. Thus, part counts have been reduced and, therefore, inventory costs have been lowered. Moreover, as compared to the assembly 10 shown in FIG. 1, the time to assemble the gear shaft assembly 100 has been greatly reduced to approximately one-third of the prior assembly time. Additionally, the use of the blind hole 110 instead of an open ended bore reduces the potential for leakage by 50% over devices such as that shown in FIG. 1.

Although certain instantiations of the teachings of the invention have been described herein, the scope of coverage of this patent is not limited thereto. On the contrary, this patent covers all instantiations of the teachings of the invention fairly falling within the scope of the appended claims either literally or under the doctrine of equivalents.

What is claimed is:

1. For use with a pump, a gear shaft assembly comprising:
   a housing defining a cavity, a first bore disposed in a first side of the housing, and a second bore disposed in a second side of the housing opposite the first bore;
   a stepped shaft having a first end with a first diameter disposed in the first bore, and a second end with a second diameter disposed in threaded engagement with the second bore, the shaft having an intermediate section with a third diameter disposed between the first and second ends, the first diameter being smaller than the third diameter such that the shaft includes a first shoulder between the intermediate section and the first end, the first shoulder engaging a portion of the housing to define a fully inserted position of the shaft, the third diameter being smaller than the second diameter such that the shaft includes a second shoulder between the intermediate section and the second end; and
   a gear disposed for rotation about the intermediate section of the shaft between the first and second shoulders.

2. A gear shaft assembly as defined in claim 1 wherein the portion of the housing engaging the first shoulder comprises a boss projecting into the cavity.

3. A gear shaft assembly as defined in claim 2 wherein the gear is disposed adjacent the boss when the shaft is in the fully inserted position.

4. A gear shaft assembly as defined in claim 2 wherein the gear is coupled to an eccentric disposed for rotation on the shaft.

5. A gear shaft assembly as defined in claim 4 wherein the eccentric is disposed adjacent the second shoulder.

6. A gear shaft assembly as defined in claim 4 wherein the eccentric is disposed adjacent the boss.

7. A gear shaft assembly as defined in claim 4 wherein the gear and the eccentric are integrally formed.

8. A gear shaft assembly as defined in claim 1 further comprising an o-ring seal located adjacent the second end to substantially prevent leakage through the second bore.

9. A gear shaft assembly as defined in claim 1 wherein the second end defines bores dimensioned and located to facilitate threading the shaft into the housing with a spanner wrench.

10. A gear shaft assembly as defined in claim 1 wherein the first bore comprises a blind hole.

11. For use with a pump, a gear shaft assembly comprising:
    a housing defining a cavity, a first bore and a second bore, the first and second bores being disposed in substantial alignment on opposite sides of the housing, the housing including a boss disposed opposite the second bore;
    a shaft having a longitudinal axis, a first end dimensioned for insertion into the first bore and a second end dimensioned for insertion into the second bore, the shaft including a first shoulder adjacent the first end, a second shoulder adjacent the second end wherein the second end of the shaft is in threaded engagement with the second bore and the first shoulder cooperates with the boss to define a fully inserted shaft position; and a gear located for rotational movement on the shaft between the second shoulder and the boss, the second shoulder and the boss substantially preventing movement of the gear along the longitudinal axis of the shaft.

12. A gear shaft assembly as defined in claim 11 further comprising an eccentric disposed adjacent the gear for rotational movement on the shaft.

13. A gear shaft assembly as defined in claim 12 wherein the gear and the eccentric are integrally formed.

14. A gear shaft assembly as defined in claim 11 wherein the first bore comprises a blind hole.

15. A gear shaft assembly as defined in claim 11 further comprising an o-ring seal located on the shaft adjacent the second end to substantially prevent leakage through the second bore.

16. A gear shaft assembly as defined in claim 11 wherein the second end defines bores dimensioned and located to facilitate threading the shaft into the housing with a spanner wrench.

* * * * *